United States Patent [19]

Englar et al.

[11] 4,387,869
[45] Jun. 14, 1983

[54] MONO-ELEMENT COMBINED SUPERCRITICAL HIGH LIFT AIRFOIL

[75] Inventors: Robert J. Englar, Derwood; Gregory G. Huson, Gaithersburg, both of Md.

[73] Assignee: The United States of America as represented by the Secretary of the Navy, Washington, D.C.

[21] Appl. No.: 238,265

[22] Filed: Feb. 25, 1981

[51] Int. Cl.³ .............................................. B64C 21/04
[52] U.S. Cl. ................................. 244/207; 244/35 R; 416/90 A; 416/20 R; 114/278
[58] Field of Search ................... 244/35 R, 207, 12.5, 244/23 D, 110 B; 416/20 R, 90 A; 239/265.23, DIG. 7; 60/231; 114/162, 278; 440/67

[56] References Cited

U.S. PATENT DOCUMENTS

| | | | |
|---|---|---|---|
| 2,868,479 | 1/1959 | Kadosch et al. | 244/207 |
| 3,590,762 | 7/1971 | Yuan | 114/278 |
| 3,669,386 | 6/1972 | Jacobs et al. | 244/207 |
| 3,830,450 | 8/1974 | Williams et al. | 244/207 |
| 4,072,282 | 2/1978 | Fulker et al. | 244/35 R |
| 4,137,008 | 1/1979 | Grant | 416/90 A |

OTHER PUBLICATIONS

AIAA-80-1825, Advanced Circulation Control Wing System for Navy STOL Aircraft, J. H. Nichols, et al., Aug. 4-6, 1980.

*Primary Examiner*—Charles E. Frankfort
*Attorney, Agent, or Firm*—R. F. Beers; L. A. Marsh

[57] ABSTRACT

A multi-purpose mono-element airfoil is disclosed for aerodynamic and hydrodynamic vehicles and devices. The multipurpose mono-element highlift airfoil when utilized in an aerodynamic application provides a combined no-moving-parts high lift and cruise airfoil which in conjunction with a plenum, upon pressure initiation, causes pressurized air to issue from a slot tangent to the airfoil surface and remains attached to the airfoil's shaped trailing edge, providing a controlled resultant force of thrust. Upon application to hydrodynamic vehicles, the multi-purpose mono-element airfoil is placed in the freestream and provides turning or pitching forces to the vehicle without any deflection of itself or any mechanical components.

3 Claims, 4 Drawing Figures

COMBINED SUPERCRITICAL/CCW HIGH LIFT AIRFOIL

CIRCULATION CONTROL WING SECTION AS FLIGHT TESTED ON A-6/CCW AIRCRAFT

TYPICAL NASA SUPERCRITICAL AIRFOIL (17% THICK)

COMBINED SUPERCRITICAL/CCW HIGH LIFT AIRFOIL

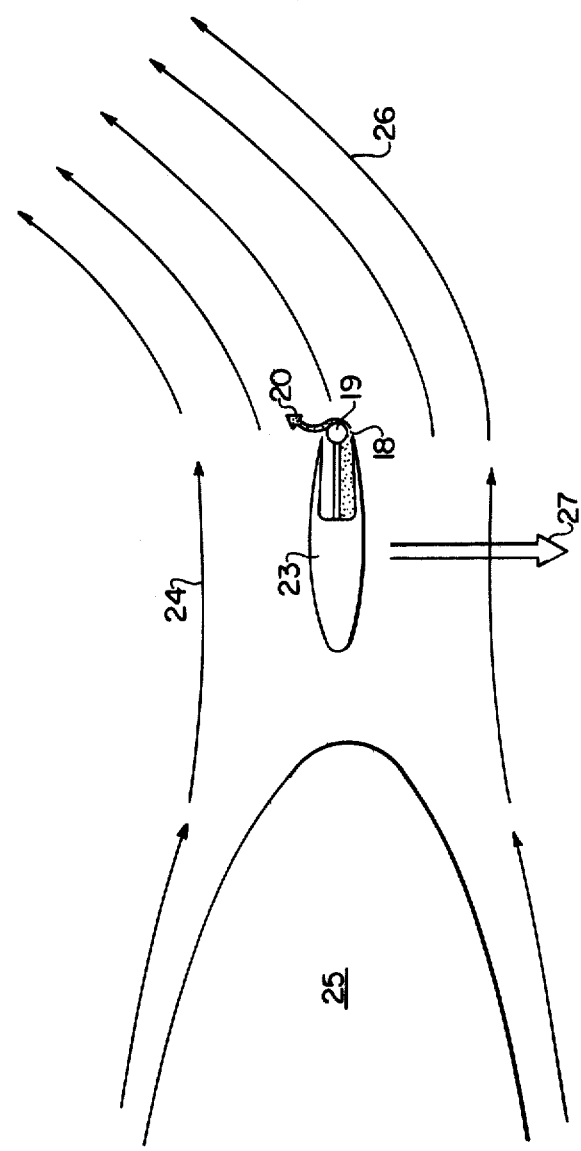

MONO-ELEMENT COMBINED SUPERCRITICAL HIGH LIFT AIRFOIL

BACKGROUND OF THE INVENTION

1. Field of the Invention

This invention relates to and provides for a mono-element combined supercritical high lift airfoil comprising a mechanically simple but effective blown high lift system compatible with and enclosed within the physical contours of the general family of transonic cruise wing sections known as supercritical airfoils. Heretofore, in order to generate high lift, such airfoils have been combined with conventional mechanical flap systems which incur high weight penalties. The high lift airfoil of the present invention requires no movement or deflection of any mechanical components within or on the airfoil, and transitions from the cruise mode to the high lift mode merely by initiating blowing from within the airfoil. The airfoil of this invention augments and enhances each component in its specific region of operation, thus providing a simple non-mechanical mono-element airfoil with uncompromised performance in the cruise, takeoff, and landing flight regimes. Upon application to hydrodynamic vehicles, the no-moving-parts trailing edge is applied to a fin or control surface and provides turning or pitching forces to the vehicle without any deflection of itself, thus replacing mechanical rudders, elevators or vanes.

2. Description of the Prior Art

Existing mechanical high lift systems or devices are used to provide an effective increased camber to the airfoil, thus providing increased streamline deflection, increased circulation, and resulting higher lift. Most state-of-the-art systems provide some type of mechanical deflection of a trailing edge flap, with those producing the greatest lift usually requiring multiple flap components, actuators, connectors, tracks, and structural mounting components. Such systems or devices greatly increase complexity and weight, as well as, increase maintenance requirements. More recently, blowing over these flap surfaces has added increased lift capability; however, complexity and weight are increased further. The recently developed circulation control wing (CCW) system increases lifting capability by blowing over a round trailing edge, but this device must be retracted to avoid the drag penalty in cruise.

Existing hydrodynamic control surfaces, such as, fins, rudders, stabilizers, elevators, etc. are used to provide an effective control of the vehicle. Such control surfaces and their actuators are also complex, and increase weight and maintenance requirements.

SUMMARY OF THE INVENTION

The present invention relates to a multi-purpose mono-element airfoil means for use in aerodynamic and hydrodynamic vehicles and devices. Upon utilization in an aerodynamic application, the multi-purpose mono-element airfoil means in conjunction with a plenum, upon pressure initiation, causes pressurized air to issue from a tangential slot and remain attached to the shaped trailing edge and provides a controlled resultant force or thrust. Upon application to hydrodynamic vehicles, the multi-purpose mono-element airfoil means is placed in the fluid stream and provides turning or pitching forces to the vehicle without any deflection of itself.

Accordingly, an object of this invention is to provide a multi-purpose mono-element airfoil means for use in aerodynamic and hydrodynamic vehicles and devices.

Another object of this invention is to provide a multi-purpose mono-element airfoil means wherein the included high lift components are located within a supercritical airfoil means such that the combined system provides and controls entrained air flow that yields additional lift augmentation, drag reduction and high cruise performance at subsonic and transonic speeds, without any physical or mechanical change in the airfoil profile or shape. Furthermore, the favorable characteristics of both cruise and high lift airfoils are not compromised.

A further object of this invention is to provide similar advantages when it is used in a hydrodynamic application where control forces are provided and the need for deflecting surfaces and trailing edges and their actuators is eliminated.

BRIEF DESCRIPTION OF THE DRAWINGS

FIG. 4 shows a hydrodynamic control surface or force generator containing no moving parts.

DESCRIPTION OF THE PREFERRED EMBODIMENT

Figure 1:
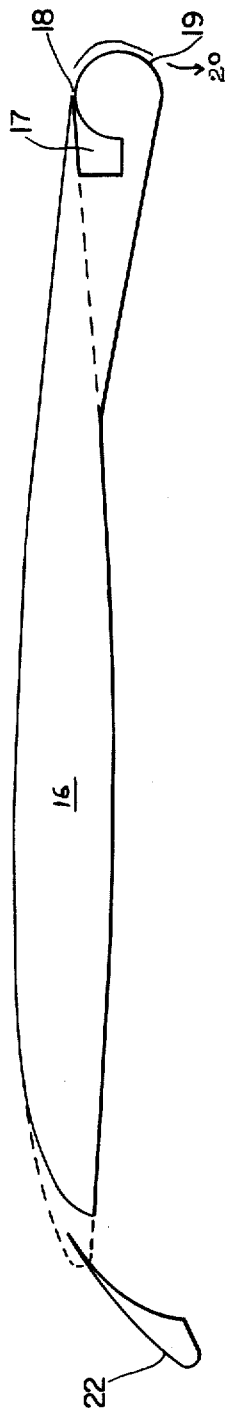
FIG. 1 shows a state-of-the-art circulation control wing high lift system as tested on A-6/CCW aircraft (thin profile with large round trailing edge)
Figure 2:
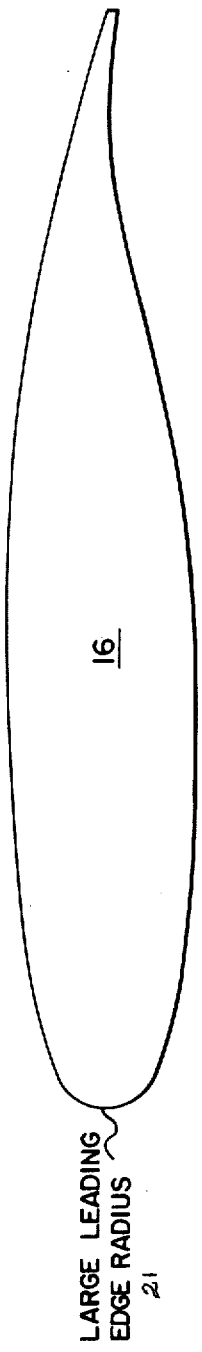
FIG. 2 shows a 17% thick NASA supercritical airfoil having a typical aft camber, bluff trailing edge thickness, and large leading edge radius.
Figure 3:
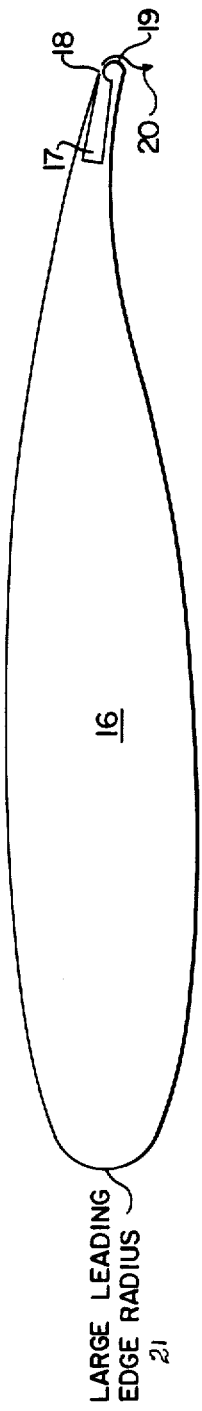
FIG. 3 shows the favorable characteristics of the present invention wherein the supercritical and CCW airfoils are synergistically combined to utilize the advantages of each.

FIG. 1 shows a state-of-the-art circulation control wing (CCW) configuration, the high lift operation of which has been confirmed by flight test. The aircraft wing 16 has mounted within its trailing edge an air supply plenum 17 which replaces the previously used mechanical flap at the wing trailing edge, along with shaped trailing edge 19 and slot 18 from which issues a circulation control (CC) jet sheet 20 produced by pressurized air from plenum 17. The present invention is shown in FIG. 3 where the thick aft section of the supercritical airfoil profile 16, originally designed as shown in FIG. 2 to control shock-induced flow separation at transonic speeds, is ideally suited to incorporate the small CCW shaped trailing edge radius 19. Supercritical airfoils typically use trailing edges having a height of 2% of the chord length, as shown in U.S. Pat. No. 4,072,282, FIG. 49. Further, said thickness ahead of shaped trailing edge 19 allows installation of plenum 17 to carry bleed air from the aircraft thrust engine or auxiliary power unit to blowing slot 18. The combined airfoil's performance is not compromised by the high lift system, and the high lift system does not have to be mechanically retracted for cruise flight.

A test wherein the trailing edge radius 19 size is about twenty-five percent the size of that previously flight tested, i.e. 0.9% chord versus 3.6% chord, shows substantially no lift loss relative to that generated by the larger radius; and further, lift generation by the small radius is two to three times greater than that achievable by the best multi-element mechanical flap system. This very efficient lift generation is achieved by blowing a thin sheet of pressurized air from a small slot 18 tangentially over a shaped trailing edge 19 as shown in FIG. 3. Jet sheet 20 remains attached to shaped trailing edge 19 and induces large flow circulation and resulting high lift on airfoil 16, all at a relatively low jet blowing rate. Moreover, this test utilizing small trailing edge radius demonstrated no increase in blowing-off drag levels above those of the bluff trailing edge configuration shown in FIG. 2. And, even though the shaped trailing edge 19 (i.e. total trailing edge thickness) is approximately twice the thickness of the supercritical trailing edge of FIG. 2, the flow remains attached around part of the shaped curvature without blowing so that the base drag generated is the same as that of the sharp-cornered flat trailing edge as shown in FIG. 2. Thus, in operation, the high lift system is non-moving and self-contained, produces no cruise drag penalty, is readily available by initiating blowing and generates at least double or triple the lift of the very complex mechanical multi-element flaps.

The blowing slot 18 located at the shaped trailing edge 19 further augments the supercritical airfoil's 16 transonic performance. A slight amount of blowing at transonic speeds entrains flow into the jet sheet 20 and prevents aft flow separation, thus reducing transonic cruise drag. Transonic maneuverability is also enhanced, as initiation of blowing provides instantaneous lift increase and the resulting change in flight path.

The large leading edge radius 21 of supercritical airfoil 16 of this invention, originally designed to provide smooth convergence into the virtually flat upper surface, aids the high lift performance by becoming an effective leading edge device. Under high lift conditions, CCW airfoils require means for keeping leading edge flow attached. A leading edge slat 22 illustrated in FIG. 1, or droop is frequently used for sharp leading edge airfoils. However, the existence of a large bluff leading edge, as illustrated in FIGS. 2 and 3, avoids this problem as it naturally keeps leading edge velocities lower and prevents flow separation. Thus, the leading edge shape of the supercritical airfoil 16 eliminates the need for a leading edge device 22 on the high lift airfoil of this invention.

In operation, only a fast-responding flow valve or regulator is required to control air flow to power the high lift system. The valve may be mounted inside the aircraft fuselage or in the wings. With the valve closed in cruise, airfoil 16 possesses the favorable transonic characteristics of the supercritical airfoil. For takeoff or landing where high lift requirements are functions of gross weight and speeds and distance desired, the valve is opened proportionally to yield the value of lift required. The small CCW device of this invention allows that value to be twice or three times that available from mechanical systems, without any moving parts. Thus, the resulting takeoff and landing speeds and distances are proportionally reduced. The flow valve may also be opened a small amount in cruise flight to reduce base drag, or a slightly larger amount to provide instantaneous lift for maneuverability.

FIG. 4 illustrates a hydrodynamic application of a non-deflecting small shaped trailing edge 19 in conjunction with dual plenums and slots 18 of a control surface 23 placed in a fluid freestream 24 behind a hydrodynamic vehicle 25. The freestream 24 is then deflected in either direction 26 depending on which of the plenums 18 is pressurized, thus producing a controlling force 27 or moment in the appropriate direction. The small trailing edge 19 fits within the existing control surface 23 contour and requires no mechanical deflection. Advantages are similar to the ones from use in the aerodynamic application, namely, rapid deflection of control forces, augmentation of control force, and system simplicity through elimination of moving parts.

This invention, for the first time, yields an advantage not heretofore attainable, namely, the synergistic and mechanically simple combination of a supercritical transonic airfoil and a high lift CCW airfoil into a single, no-moving-parts airfoil which maintains the favorable characteristics of each type of airfoil in its design operating regime yet does not compromise either airfoil's operation by the presence of the other. A further important advantage is its ability to transition from one mode of operation to the other without the use of any mechanical parts. Such unique features of this combination yield other advantages in its savings of special airfoil meterials and energy used heretofore. Other advantages will be apparent from the specification described above to those skilled in the art.

Alternate variations in the geometry of the CC shaped trailing edge 19 are desirable to augment system operation and are utilized under certain circumstances. Round, partially round, elliptical and spiral shapes of trailing edge 19 can be used to yield desired results under specified required conditions. For example, a partially rounded trailing edge 19 may be preferred when full high lift capability is not required and where drag reduction is advantageous. Or, a forced separation location, less the 180 degrees from slot 19 may be advantageous to reduce cruise drag. Other alternatives, such as, various in slot size and other geometric arrangements are useful in utilizing this invention.

Obviously, many modifications and variations of the present invention are possible in light of the above teachings. It is therefore to be understood that within the scope of the appended claims the invention may be practiced in ways other than as specifically described above.

What is claimed is:

1. A mono-element airfoil for providing high lift generation, drag reduction and high cruise performance at subsonic and transonic speeds, comprising:
   a supercritical airfoil means having a large leading edge radius and a relatively blunt trailing edge, said trailing edge having a thickness of about 2% of the chord length of said airfoil means;
   a plenum inside said wing having an inlet connected to a source of gas pressure and an outlet in the trailing edge of said airfoil means;
   said outlet being formed as a slot means between an upper portion and a lower portion;
   said upper portion being a part of the upper surface of said wing and having a reduced thickness near the rear edge;
   said lower portion forming the rear wall of said plenum, the lower edge of said slot and the trailing edge of said airfoil means, said lower portion being circular in cross section and having a constant radius of no greater than 1% of the chord length of said supercritical airfoil means;
   said slot means having a smoothly converging nozzle with the portion of said nozzle having the minimum height being at the rear edge of said upper portion;
   said outlet forming a circulation control device wherein gas from said source of gas pressure is controlled to travel through said plenum, escape through said converging nozzle and slot means and travel along the trailing edge of said airfoil to deflect the air traveling over the top surface of said airfoil means downwardly.

2. The airfoil according to claim 1 further comprising an internal valve to control the flow rate through said slot means and thus control the deflection of the airstream.

3. The airfoil according to claim 2 wherein said plenum is located near the trailing edge of said airfoil means.

* * * * *